US007073533B2

United States Patent
Bruck et al.

(10) Patent No.: US 7,073,533 B2
(45) Date of Patent: Jul. 11, 2006

(54) PRESSURE REGULATING VALVE, IN PARTICULAR PROPORTIONAL PRESSURE REGULATING VALVE

(75) Inventors: Peter Bruck, Althornbach (DE); Thorsten Hillesheim, Saarbrücken (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 10/492,082

(22) PCT Filed: Sep. 26, 2002

(86) PCT No.: PCT/EP02/10781

§ 371 (c)(1), (2), (4) Date: Apr. 9, 2004

(87) PCT Pub. No.: WO03/034171

PCT Pub. Date: Apr. 24, 2003

(65) Prior Publication Data

US 2004/0256012 A1    Dec. 23, 2004

(30) Foreign Application Priority Data

Oct. 11, 2001    (DE) ................ 101 50 238

(51) Int. Cl.
*F15B 13/44*    (2006.01)

(52) U.S. Cl. ............... 137/625.68; 137/625.65

(58) Field of Classification Search ........... 137/625.65, 137/625.68

See application file for complete search history.

(56) References Cited

U.S. PATENT DOCUMENTS

| | | | | |
|---|---|---|---|---|
| 2,893,428 A | * | 7/1959 | Collins | 137/625.68 |
| 4,491,153 A | | 1/1985 | Bartholomaus | |
| 4,579,145 A | | 4/1986 | Leiber et al. | |
| 5,592,972 A | * | 1/1997 | Niethammer | 137/625.68 |
| 6,269,827 B1 | * | 8/2001 | Potter | 137/625.65 |
| 6,289,921 B1 | * | 9/2001 | Neuhaus et al. | 137/625.65 |
| 6,408,883 B1 | * | 6/2002 | Motoki et al. | 137/625.65 |

FOREIGN PATENT DOCUMENTS

| | | |
|---|---|---|
| EP | 0 451 347 A2 | 10/1991 |
| EP | 1 091 131 A1 | 4/2001 |

* cited by examiner

*Primary Examiner*—John Rivell
(74) *Attorney, Agent, or Firm*—Roylance, Abrams, Berdo & Goodman, L.L.P.

(57) ABSTRACT

A pressure regulating valve, in particular a proportional pressure regulating valve, includes a valve body (1) with at least a pump connection (P), a use connection (A) and a tank connection (T). A piston (19), capable of being displaced by a controllable actuating device (29), is guided in the valve body (1). At the periphery of the piston, a recess (45) is formed and defines a peripheral annular gap (47) delimited by the control edges (49, 51) of the piston (19). In the piston (19), a passage (55) provides fluid communication between the front surface of the piston (19), subjected to the use connection (A) pressure, and the rear surface (35) of the piston (19), adjacent to a pressure chamber (37) located behind. The passage (55) of the piston (19) has, in the region proximate to the piston front surface, a restriction zone (57). In a region away from the restriction zone (57) towards the rear of the piston surface (35), an orifice (59) faces the peripheral annular gap (47), and has a second restriction zone (61).

16 Claims, 1 Drawing Sheet

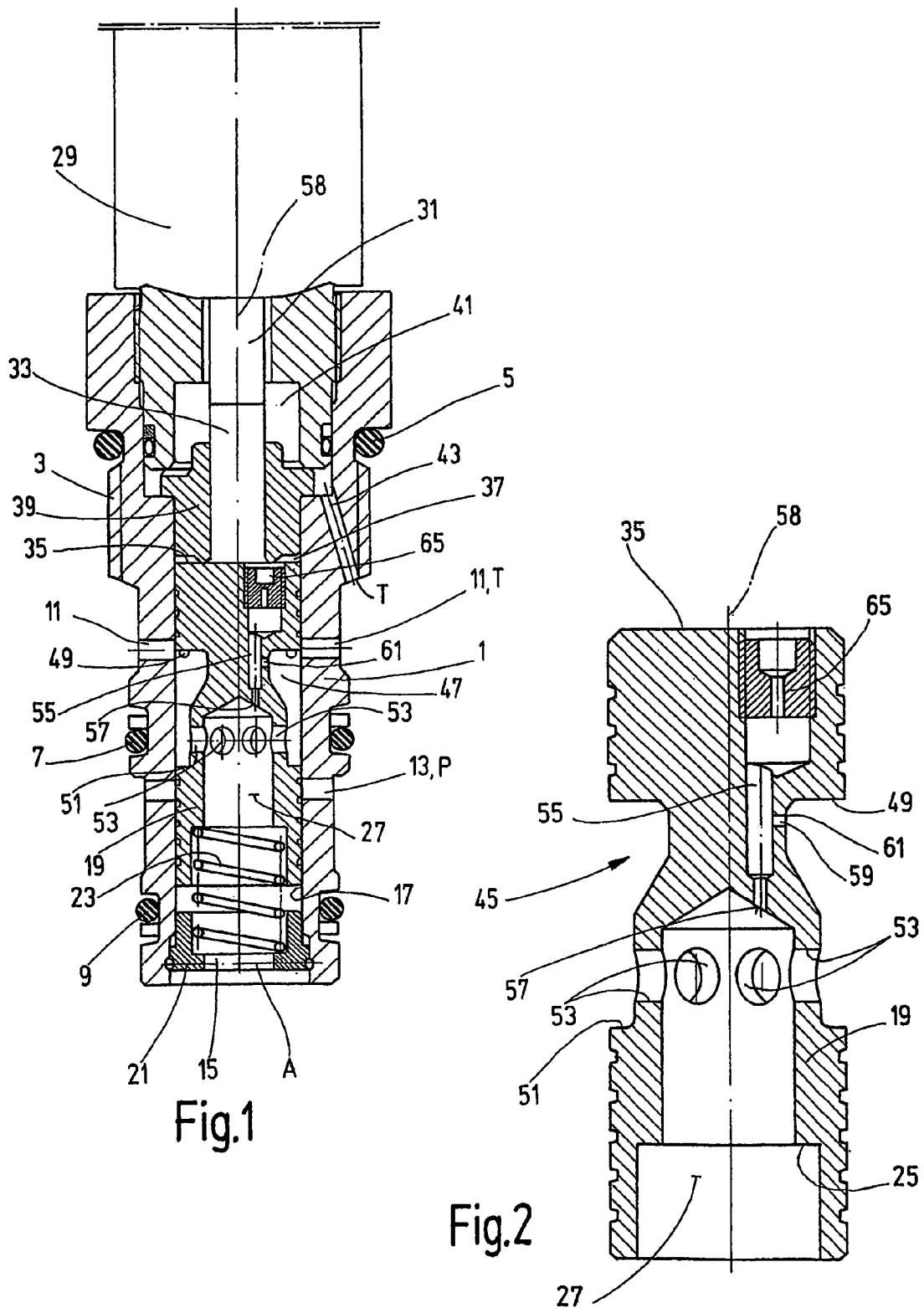

PRESSURE REGULATING VALVE, IN PARTICULAR PROPORTIONAL PRESSURE REGULATING VALVE

FIELD OF THE INVENTION

The present invention relates to a pressure regulating valve, in particular a proportional pressure regulating valve, having a valve housing with at least one pump connection, one application connection, and one tank connection. A valve piston is displaceable in the valve housing by a controllable actuating device. A recess in the valve piston circumference defines a circumferential annular space delimited by control edges of the piston. A passage formed in the piston establishes a fluid connection between the front side of the piston to which the pressure of the appliance connection is applied and the rear side of the piston adjacent to a pressure chamber on the rear side of the piston.

BACKGROUND OF THE INVENTION

Valves of this type are usually available through commercial channels. Since the predominant control pressure applied to the appliance connection acts on both sides of the valve piston in such directly controlled pressure limiting valves by means of the associated actuating device, and since the control pressure accordingly does not exert its effect on the valve piston, the same valve piston diameter may be advantageously used for different pressure stages involved. In other words, even at higher pressure stages, no especially small valve piston diameter need be chosen to keep the piston forces which occur within limits. Such valves with valve pistons of sufficiently large diameter may be designed for relatively high rated volume flows.

Although high piston forces are not applied to the actuating system in a valve of this design, the flow forces occurring during operation on the control edges of the valve piston are transmitted undiminished to the actuating system. This disadvantage results in the operating characteristic of the valve having a relatively sharply rising curve in the pressure restriction function and a sharply dropping curve in the pressure reduction function. This falling characteristic occurs in particular in the case of pump pressures which are very high in comparison to the control pressure, since the sharp drop in pressure causes especially high flow forces to be applied to the respective control edge of the valve piston, reducing the opening stroke of the piston.

SUMMARY OF THE INVENTION

An object of the present invention is to provide a proportional pressure regulating valve having improved behavior in operation.

According to the present invention, this object is attained by a proportional pressure regulating valve in which the passage of the piston has a flow restriction point in the area adjacent to the front side of the piston and in which a passage leading to the circumferential annular space in an area shifted from the flow restriction point toward the rear side of the piston has a second flow restriction point.

This combination of the present invention of two flow restriction points associated with the passages of the valve piston makes it possible to change the prevailing pressure on the rear side of the piston so that a force is applied to the piston which always acts against the flow forces occurring on the control edges during operation, and thus, acts as an auxiliary stroke in both the pressure restriction function and the pressure reduction function. As a result, the operating characteristic of the valve may be optimized as desired by suitable dimensioning of the passage cross-section of the flow restriction point.

The dynamic operating behavior of the valve may also be affected, as desired, in that the passage of the valve piston has a third flow restriction point in the area between the passage leading to the annular space and the opening in the rear side of the piston. As a result of the configuration of this flow restriction point in the form, for example, of a screw-in orifice introduced into the passage of the piston from the rear side of the piston, damping action for suppression of vibrations may be effected in conjunction with the pressure chamber adjoining the rear side of the piston.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view in section of the pressure regulating valve configured as a screw-in valve according to an embodiment of the present invention; and FIG. 2 is a side elevational view in section of the valve piston of FIG. 1 drawn on a somewhat larger scale.

DETAILED DESCRIPTION OF THE INVENTION

The pressure regulating valve shown in the drawings and described hereinafter is represented by a so-called screw-in valve. The sleeve-like valve housing 1 of the valve has external threading 3 so that it may be screwed into a valve recess (not shown). Annular sealing elements 5, 7 and 9 are seated on the valve housing 1 on the outer circumference side and are provided for sealing to prevent entry of fluid into the valve recess. In the circumferential area of the valve housing 1 situated between sealing elements 5 and 7, which area is sealed by the sealing elements 5 and 7 to prevent entry of fluid into the remaining circumferential area of the valve housing 1, the sleeve-like valve housing 1 has wall openings 11 which communicate with tank connection T of the associated fluid system when the valve housing 1 has been screwed into the valve recess. In the circumferential area situated between the sealing elements 7 and 9, the valve housing has wall openings 13 which are connected to the pump connection P of the fluid system. At its free end, the sleeve-like valve housing 1 is open, forming sleeve opening 15 connected by the valve recess to the pressure conducting appliance connection A of the system.

The valve housing 1 forms, in its interior, a cylindrical tube or surface 17 in which a valve piston 19, acting as sleeve valve, is axially displaceable. The valve piston 19 is shown separately in FIG. 2 on a scale larger than that of FIG. 1 to illustrate the structure of this valve piston.

A support ring 21 is mounted in the sleeve opening 15, associated with the appliance connection A to provide support for a helical pressure spring 23. The other side of the spring 23 rests on a shoulder 25 (FIG. 2) in an interior cavity 27 of the valve piston 19. The spring 23 generates a resetting force which tries to displace or bias the piston 19 against the magnetic force of a magnet system 29 directly controlling the pressure regulating valve.

The armature 31 of the magnet system 29 exerts a mechanical effect on the rear side of the valve piston 19 by a pin element 33. The pin element 33 serves as auxiliary piston (described in greater detail below).

The rear side 35 of the piston adjoins a pressure chamber 37. The rear side of the pressure chamber 37 in turn is adjacent to a bushing 39 rigidly or fixedly connected to the cylindrical tube 17 and serving as guide for the pin element 33. The end of the pin element 33 facing away from the pressure chamber 37 extends into another pressure chamber 41 immediately adjacent to the magnet system 29. The pressure chamber 41, by a connecting channel 43, conducts the pressure of the tank connection T, which is adjacent to the wall openings 11 of the valve housing 1.

As is shown the most clearly in FIG. 2, the valve piston 19 has a necked-down circumferential section 45 which, together with the wall of the cylindrical tube 17 of the valve housing, defines an annular space 47. The axial extent of the annular space 47 is delimited by control edges 49 and 51. During operation of the pressure regulating valve, the control edge 49 operates in conjunction with the wall openings 11 of the valve housing 1 associated with the tank connection T. The control edge 51 in turn operates during execution of the pressure reduction function in conjunction with wall openings 13 conducting the pump pressure and associated with the pump connection P. Passage openings 53 in the necked-down circumferential area 45 of the valve piston 19 establish the fluid connection between the inner cavity 27 of the valve piston 19 conducting the control pressure of the appliance connection A and the annular space 47.

A passage 55 extending through the valve piston 19 establishes a fluid connection between the inner cavity 27 and the rear-side pressure chamber 37 situated on the rear side of the piston 35. In the stationary situation, control pressure from the appliance connection A is applied on both sides of the valve piston 19. Accordingly, no piston displacement force dependent on the control pressure acts on the control piston 19. The force determining the level of the pressure stage, applying a load to the magnet system 29 and depending on the control pressure, is generated by the pin element 33 serving as auxiliary piston. The pin element 33 is independent of control pressure at the pressure chamber 37. The pressure of the tank connection T is applied at the opposite end of pin element 33 in pressure chamber 41. The force applied to the magnet system 29 accordingly depends on the effective piston surface of the pin element 33, but not on the effective piston diameter of the valve piston 19.

As shown most clearly in FIG. 2, the passage 55 extending axially in the valve piston 19 has specific features which exert a significant effect on the operating characteristic of the pressure regulating valve. A flow restriction point 57 is formed at the orifice or opening of the passage 55 into the inner cavity 27 of the piston 19. In the embodiment illustrated, this flow restriction point is provided by a cross-sectional narrowing of the passage 55. In the area of the passage 55 axially displaced toward the rear side 35 of the piston, a passage 59 branches off from passage 55 and extends perpendicularly to the longitudinal axis 58. This passage 59 leads to the annular space 47 on the necked-down circumferential area 45 of the piston 19. This passage 59 forms a second flow restriction point 61. In the example illustrated, the two flow restriction points 57 and 61 are formed by suitably reduced bore diameters. The flow restriction points 57, 61 can also be formed by orifice inserts or the like.

The flow restriction points 57, 61 affect the flow of fluid in the passages 55 to bring about, when combined, modification of the pressure prevailing on the rear side 35 of the piston in the pressure chamber 37, as a function of the respective pressure drop which occurs on the control edge 51 during operation of the valve and on the control edge 49 when the pressure restriction function is performed. The respective sharp pressure drop causes very high flow forces to be applied to the valve piston 19, forces which act against the respective operating stroke required of the piston 19. The fluid flow through the two intercommunicating flow restriction points 57, 61 results in dynamic operation in modifying of the pressure prevailing on the rear side 35 of the piston in the pressure chamber 37. As a result of suitable dimensioning of the flow restricting action of the flow restriction points 57 and 61, the operating characteristic of the valve may be optimized so that the respective modified pressure on the rear side 35 of the piston generates an auxiliary stroke. The auxiliary stroke works against the flow forces acting on the piston 19 in the pressure reduction function and the pressure restriction function, respectively.

In the embodiment illustrated, a third flow restriction point is provided in the passage 55 of the piston 19 in the area between the passage 59 and the edge of the mouth on the rear side 35 of the piston. This third flow restriction point is provided by a screw-in orifice 65. In conjunction with pressure chamber 37 present on the rear side 35 of the piston, a damping effect may be produced by suitable dimensioning of the throttle action. The valve dynamics may consequently be effectively modified through variation of the flow restriction action of the screw-in orifice 65.

While one embodiment has been chosen to illustrate the invention, it will be understood by those skilled in the art that various changes and modifications can be made therein without departing from the scope of the invention as defined in the appended claims.

What is claimed is:

1. A proportional pressure regulating valve, comprising:
    a valve housing having at least one pump connection, appliance connection and tank connection, and having a rear pressure chamber;
    a valve piston displaceably mounted in said valve housing and having a circumference, a front side in fluid communication with said appliance connection and a rear side adjoining said rear pressure chamber;
    a recess in said circumference defining a circumferential annular space located and extending axially between and selectively connectable to said pump connection and said tank connection;
    control edges on said valve piston delimiting said annular space;
    a first passage extending in said valve piston forming a fluid connection between said front side and said rear side of said valve piston, said first passage having a first flow restriction point adjoining said front side of said valve piston; and
    a second passage in said valve piston extending between said annular space and said rear side of said piston valve, being spaced from said first restriction point and having a second flow restriction point.

2. A proportional pressure regulating valve according to claim 1 wherein
    an actuating device is mounted on said housing and has a magnetic armature applying a resetting magnet force against said valve piston, against which said valve piston can be displaced.

3. A proportional pressure regulating valve according to claim 2 wherein said magnetic armature is mechanically connected to said valve piston by an auxiliary piston that is axially movable in said valve housing, that is connected on a side thereof facing said valve piston to pressure in said rear pressure chamber, and that is connected on an opposite side thereof to pressure of said tank connection.

4. A proportional pressure regulating valve according to claim 1 wherein said first passage has a third flow restriction point between said second passage and an opening on said rear side of said valve piston.

5. A proportional pressure regulating valve according to claim 4 wherein said third flow restriction point is an orifice screwed in said valve piston from said rear side thereof.

6. A proportional pressure regulating valve according to claim 1 wherein dimensions for fluid passage through said first and second flow restriction points provide optimized operating characteristics.

7. A proportional pressure regulating valve according to claim 5 wherein said third flow restriction point has dimensions for fluid passage therethrough for generating a damping effect on said rear side of said valve piston with said rear pressure chamber.

8. A proportional pressure regulating valve according to claim 1 wherein said valve housing comprises external threads for threaded engagement with a recess.

9. A proportional pressure regulating valve according to claim 8 wherein said valve housing comprises wall openings axially displaced relative to one another and operating with said control edges and said pump and tank connections.

10. A proportional pressure regulating valve according to claim 9 wherein said appliance connection is provided on an open end of said valve housing and is in fluid communication with an inner cavity in said valve piston, said inner cavity being in fluid communication with such annular space through passage openings in said valve piston.

11. A proportional pressure regulating valve according to claim 10 wherein a pressure spring as one side engaging said open end of said valve housing and another side on an end of said valve piston in said inner cavity to produce a resulting force.

12. A proportional pressure regulating valve according to claim 11 wherein said magnetic armature is mechanically connected to said valve piston by an auxiliary piston that is axially movable in said valve housing, that is connected on a side thereof facing said valve piston to pressure in said rear pressure chamber, and that is connected on an opposite side thereof to pressure of said tank connection.

13. A proportional pressure regulating valve according to claim 1 wherein fluid flow through second passage from annular space to said rear side of said valve piston does not pass through said first flow restriction point.

14. A proportional pressure regulating valve according to claim 1 wherein said second passage extends laterally from said first passage to said annular space.

15. A proportional pressure regulating valve according to claim 14 wherein said second flow restricting point is located at an opening of said second passage onto said annular space.

16. A proportional pressure regulating valve according to claim 1 wherein said front side faces said appliance connection.

\* \* \* \* \*